(12) United States Patent
Willoughby (10) Patent No.: US 7,836,106 B2
(45) Date of Patent: Nov. 16, 2010

(54) METHOD, APPARATUS AND COMPUTER PROGRAM PRODUCT FOR CHANGE MANAGEMENT IN A DATA PROCESSING ENVIRONMENT

(75) Inventor: Philip Graham Willoughby, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 11/774,024

(22) Filed: Jul. 6, 2007

(65) Prior Publication Data

US 2008/0133616 A1   Jun. 5, 2008

(30) Foreign Application Priority Data

Nov. 30, 2006   (GB) ................................ 0623916.4

(51) Int. Cl.
*G06F 17/30* (2006.01)
(52) U.S. Cl. ...................... 707/822; 707/705; 717/124; 717/135
(58) Field of Classification Search ................. 707/102, 707/822, 705, 999.001, 999.102; 717/124, 717/135
See application file for complete search history.

(56) References Cited

U.S. PATENT DOCUMENTS

| | | | |
|---|---|---|---|
| 5,313,646 A * | 5/1994 | Hendricks et al. ........... 707/101 |
| 6,473,767 B1 * | 10/2002 | Bailey et al. ...................... 1/1 |
| 7,409,396 B2 * | 8/2008 | Pitts ............................ 707/10 |
| 7,484,245 B1 * | 1/2009 | Friedman et al. .............. 726/27 |
| 2003/0158836 A1 * | 8/2003 | Venkatesh et al. .............. 707/1 |
| 2003/0208686 A1 * | 11/2003 | Thummalapally et al. ... 713/193 |
| 2003/0233490 A1 * | 12/2003 | Blaser et al. ................. 709/328 |
| 2004/0133790 A1 * | 7/2004 | Hensley ....................... 713/191 |
| 2005/0172279 A1 * | 8/2005 | Cook et al. .................. 717/162 |
| 2005/0216469 A1 * | 9/2005 | Saito ............................. 707/9 |
| 2005/0257266 A1 * | 11/2005 | Cook et al. .................... 726/23 |
| 2006/0047974 A1 * | 3/2006 | Alpern et al. ............... 713/191 |
| 2006/0089936 A1 * | 4/2006 | Chalker ....................... 707/10 |
| 2007/0005615 A1 * | 1/2007 | Dodge ........................ 707/100 |
| 2007/0077034 A1 * | 4/2007 | Okuyama et al. ........... 386/112 |
| 2007/0078915 A1 * | 4/2007 | Gassoway ................... 707/205 |
| 2008/0109394 A1 * | 5/2008 | Havens et al. .................. 707/1 |
| 2008/0109906 A1 * | 5/2008 | Sallam ........................ 726/24 |

* cited by examiner

*Primary Examiner*—Charles Rones
*Assistant Examiner*—Phuong-Thao Cao
(74) *Attorney, Agent, or Firm*—David Mims; Mark P Kahler

(57) ABSTRACT

Provided are methods, apparatus and computer program products for change management within a data processing system and in particular for simulating the effect of removal of a file from the system. An anti-file is created within a file system layer that is overlaid onto a set of computer program files. The anti-file hides a corresponding first file such that overlaying the anti-file layer on the set of program files simulates the effect of removing the first file from the set of program files.

14 Claims, 6 Drawing Sheets

METHOD, APPARATUS AND COMPUTER PROGRAM PRODUCT FOR CHANGE MANAGEMENT IN A DATA PROCESSING ENVIRONMENT

FIELD OF INVENTION

The present invention provides solutions for change management in a data processing environment. In particular, the invention enables an evaluation of the effect of removing a file from a set of computer program files within either a software development and testing system or a runtime data processing environment.

BACKGROUND

A known technique for incremental software development is to put changes that need testing into a filesystem directory which is logically overlaid upon a pre-existing source code tree. Executable code can then be created from the resulting combination. The advantage of this technique is that many changes can be tested and verified without the need to rebuild the entire source code tree.

The existing technique provides adequate support for testing the effect of adding files or changing existing files, but is less helpful for testing the effect of file removal. To determine the effect of removing a file, it has been necessary for a software developer to actually remove the file from the source code tree that is used by the build system, and to rebuild the entire program. Unless the file is actually removed, a comprehensive test of the effect of file removal would need to take account of every explicit or implicit reference to that file. Implicit references by tools that will be used in the build process are difficult .for a tester to identify manually.

The above-described problem arises, for example, in a development environment that uses 'sandboxes'. A 'sandbox' is a private program development environment for a developer—isolated from other sandboxes and isolated from other developers who may be concurrently changing other code modules. Code may be developed within a developer's isolated sandbox and then combined with a pre-existing set of computer program files. A build process can then be applied to this combination of source code elements to generate executable code. Each developer working within a sandbox may wish to test the effects of adding, changing and removing files before these updates are imposed on other developers.

Additional files and file changes that are coded within the sandbox can be overlaid on a set of backing files to enable testing, but it is more difficult to test the effects of removing a file. Although a developer could identify and list the files they wish to remove, there are likely to be a number of tools (compilers, assemblers, linkers, etc that are executed to build the program) that continue to implicitly reference a nominally "absent" file. It is not practical to adapt such tools to a build-system-specific way of determining which files should be treated as absent. Therefore, the conventional approach of physically removing files and then rebuilding the complete program is still used.

Although this problem reduces software development efficiency, there is an even greater need to fully test the effect of removing files within run-time data processing environments. A user of a set of computer programs may be running business-critical applications on an application-infrastructure product for which an upgrade becomes available. The user needs to be able to test the effect of upgrading their infrastructure before proceeding, to minimize the risk of losing availability of their critical applications. Because of the difficulty of identifying implicit file references, it is currently difficult to test the effects of file removal until the new program files are installed and the old files are actually removed from the run-time environment.

SUMMARY

A first aspect of the present invention provides a file system access-controller, for managing file system access for at least one requestor, comprising:

means for identifying a set of logically distinct layers within a logical file system comprising at least an anti-file layer and a back layer, wherein the back layer comprises a first set of file system resources and wherein the anti-file layer comprises a set of file references;

means for identifying a match between a first file within the back layer and a first file reference within the anti-file layer; and means, responsive to identifying a match, for masking the presence of the first file from said at least one requester.

Another aspect of the invention provides a method, for implementation by a file system access controller within a data processing system, for managing file system access for at least one requester. The method comprises: identifying a set of logically distinct layers within a logical file system comprising at least an anti-file layer and a back layer, wherein the back layer comprises a first set of file system resources and wherein the anti-file layer comprises a set of file references; identifying a match between a first file within the back layer and a first file reference within the anti-file layer; and, in response to identifying a match, masking the presence of the first file from said at least one requester.

The at least one requestor may be any computer program or data processing system that requests access to files within the logical file system via the file system access controller.

A file reference within the anti-file layer, which file reference matches a first file within the back layer, is referred to herein as an 'anti-file' for the first file. The file system access-controller is responsive to anti-files such that a matching file reference within the anti-file layer is effective to cause the file system access-controller to mask the presence of the first file. That is, the first file appears to be absent from the perspective of any program or data processing device that attempts to access the file via the file system access-controller.

In one embodiment of the invention, the anti-file layer is a file system or a file system directory containing file names or symbolic links (i.e. containing only file references with no data contents). The anti-file layer is identifiable as an anti-file layer by the file system access-controller by virtue of, for example, the file system name or directory name of the anti-file layer. In other embodiments, the anti-file layer may simply be a file (such as a database table including a set of strings representing a set of anti-files) containing a list of anti-file names. The back layer may also be a file system of file system directory. The file references within the anti-file layer may be file names that are identical to the file names within the back layer.

The anti-file layer and back layer are preferably combined with a front layer to create a multi-layer file system. In a preferred embodiment, anti-files are effective to mask matching files within the back layer, whereas the front layer overlays the anti-file layer without the files in the front layer being masked. The different layers may be implemented within a logical file system as a predefined set of named directories (for example directories '/back', '/anti' and '/front'). A file system access controller is responsive to the directory names to determine which file names are anti-file names and to determine which matching named files should be masked (i.e. those within the '/back'directory).

In another embodiment, the anti-file layer comprises a set of one or more file names within the same file system directory as the front layer. In this embodiment, the file names of the anti-file layer are each preceded by a predefined special character that represents an anti-file, and this character is identified by the file system access controller to enable file names within the anti-file layer to be matched with file names within the back layer. For example, the file names in the anti-file layer and the back layer may be identical except for the predefined character.

The front layer and the anti-file layer may each be implemented within a sandbox and overlaid upon a back layer of a file system to enable testing of the effects of removing, changing and adding files.

One embodiment of the invention provides a filesystem driver that is responsive to anti-files to mask any file that has a matching anti-file within a higher layer of the multi-layer file system. More generally, embodiments of the invention provide 'anti-file-aware' file system access-controllers that may be implemented as integral components of a data processing system's operating system or as separable file system drivers. Other programs and systems that rely on the file system access-controller for file access are unable to detect a masked file, such that the masked files are disregarded when most data processing operations are performed. In some embodiments, masked files are not detectable by any system entity other than the 'anti-file-aware' file system access-controller. In some embodiments, anti-files are also only detectable by the anti-file-aware file system access-controller.

In an alternative embodiment, anti-files are implemented by modifying the implementation of C library calls which manipulate files such that masked files are completely disregarded or are moved to a special storage location that is protected from access by other programs and systems. An anti-file may be any logical entity that identifies a file to be masked—such as a file name stored as a string in a database table, or any other mechanism that is suitable for storing file names in a filesystem.

In one embodiment of the invention, after creating a multi-layer file system in which an anti-file layer overlays a first set of files (the back layer) and is itself overlaid (by a front layer), a second level of nesting of layers can be used to create a logical combination of this multi-layer file system together with another anti-file layer and optionally another front layer. That is, using the present invention, any multi-layer file system can be treated as a back layer to which additional layers (an anti-file layer and/or a front layer) can be applied. This may be repeated as often as required, using nested layers to investigate various logical combinations of files and anti-files.

Unlike previous approaches to testing the effects of file removal, each of the above-described layers can still be examined (by an anti-file aware program, or by removing the anti-files) to identify the various files within a particular file system layer. The masking effect can be cancelled relatively easily by removing the anti-files.

In one embodiment of the invention, the process of creating a multi-layer file system, in which a first file is combined with its anti-file to mask the first file, comprises the step of overlaying the sandbox onto elements of a 'backing build'. A 'backing build' comprises a stable set of source code components that includes the first file. In particular, the backing build (back file system layer) according to this embodiment comprises a set of program resources, associated header files and libraries that support sandboxes. Write access to this back layer is controlled by an administrator and/or a locking mechanism to achieve source code stability—i.e. to prevent inconsistent simultaneous updates by multiple developers. A set of build tools (compiler, interpreter, etc) can process the multi-layer combination of the back file system layer and one or more sandboxes to generate a new executable version of the set of program files. Multiple sandboxes from multiple developers can be applied to a single backing build, and then processed to create executable code. Since masked files and anti-files are not visible to the build tools, the new executable version omits the masked files and anti-files.

The masking mechanism of the present invention has an effect similar to a reversible file deletion mechanism, enabling testing of the effect of removing the first file. By overlaying a sandbox containing an anti-file onto a set of program files held at a central server system, program developers can test the effect of removing a file without yet performing a complex file removal and rebuild process at the central server. By enabling the developers to retrieve from the central server only those files that are required for their development and testing, the invention can be implemented without requiring huge amounts of disk space on each developer's local data processing system.

Another embodiment of the invention provides a file system access controller for a run time system administration environment. As in the above-described embodiment for use in a development environment, the file system access controller is responsive to anti-files such that a file reference within the anti-file layer that matches a first file in the back layer is effective to cause the file system access-controller to mask the presence of the first file.

A further aspect of the invention provides a data processing system comprising:

a data processing unit;

a data storage unit;

a file system comprising a logical arrangement of data within the data storage unit, the file system including a first file within a first file system layer;

means for creating an anti-file for the first file, the anti-file comprising a reference to the first file, within an anti-file layer of the file system; and a file system access-controller, for managing file system access for at least one requester, comprising: means for identifying a set of logically distinct file system layers comprising at least the first file system layer and the anti-file layer; means for identifying a match between a first file within the first file system layer and a matching anti-file within the anti-file layer; and means, responsive to identifying a match, for masking the presence of the first file from said at least one requester.

A further aspect of the invention provides a method for simulating the effects of removal of a first file from a file system within a data processing system that includes a file system access controller as described above. The method comprises the steps of:

creating a set of logically distinct layers within a logical file system comprising at least a hack file system layer and an anti-file layer;

assigning a first set of files to the back file system layer;

creating in the anti-file layer a reference to a first file of the first set of files; and in response to a request for access to the first file, executing the file system access controller to control file system access.

Aspects of the invention may be implemented in computer program code and may be made available as computer program products comprising program code recorded on a computer-readable recording medium. The program code may be made available for transfer via a data transfer medium, such as via the Internet.

BRIEF DESCRIPTION OF DRAWINGS

Embodiments of the invention are described below in more detail, by way of example, with reference to the accompanying drawings in which.

DETAILED DESCRIPTION OF EMBODIMENTS

Figure 1:
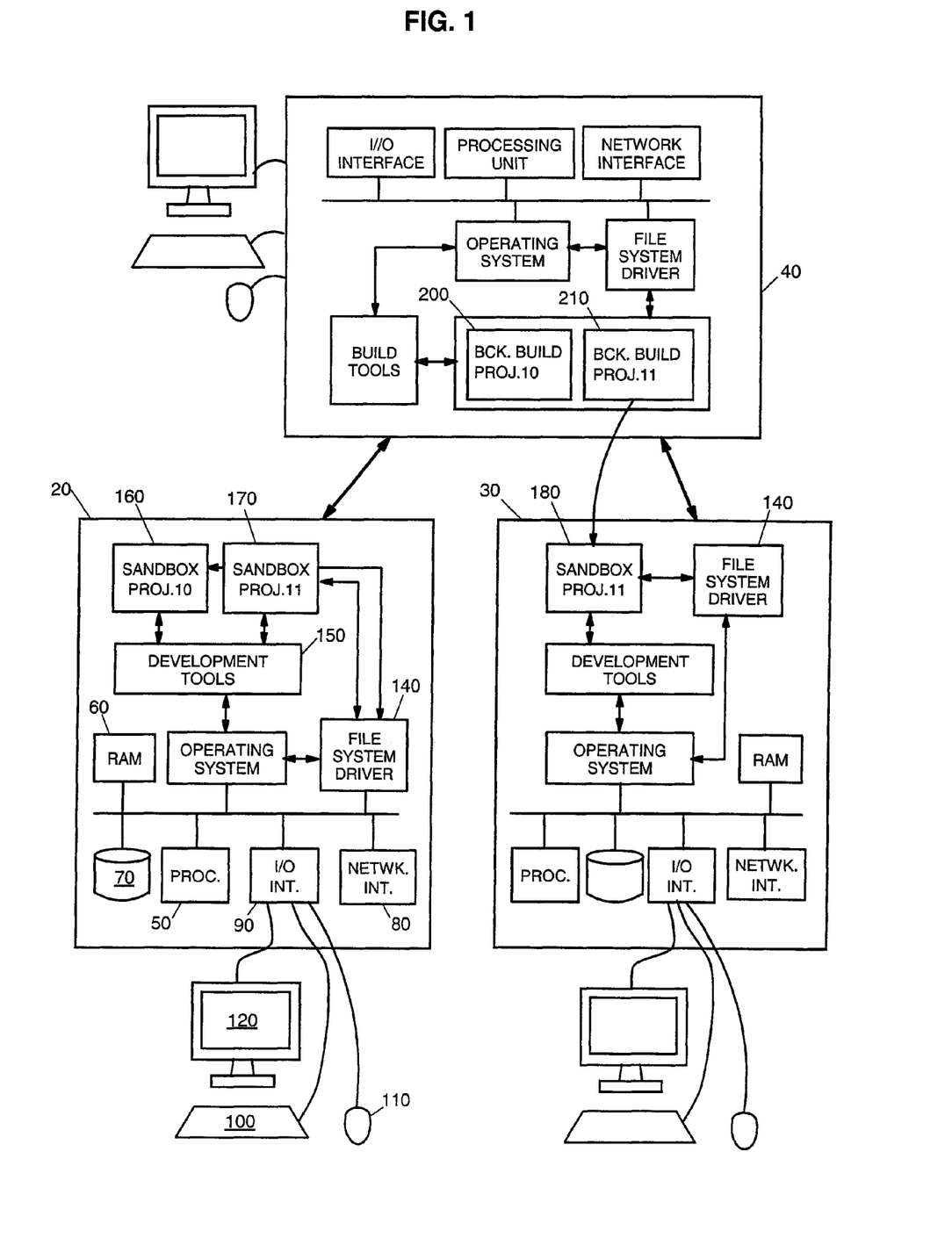
FIG. 1 is a schematic representation of a distributed software development environment in which the present invention may be implemented.

FIG. 1 shows a distributed software development environment 10 that includes a number of data processing systems 20, 30, 40. The systems 20, 30, 40 are connected via a communications network (not shown). There may be any number of data processing systems involved in the network and, subject to the requirement that the systems have sufficient memory and processing power to be suitable for use in program code development, these systems are not limited to any particular type of computer hardware. The network may be a LAN or WAN, or the Internet, without limitation to a particular network configuration or communication protocol. The network could include wired and/or wireless connections.

The particular data processing network shown in FIG. 1 implements a client-server architecture in which a plurality of client systems 20, 30 each communicate via the network with a server system 40. Each of the client systems includes a processing unit 50, system memory such as RAM 60, non-volatile storage 70, a network interface 80 and an input/output interface 90 enabling user interaction via a keyboard 100, mouse 110 and display screen 120. Each system includes an operating system 130 which includes or interfaces with a filesystem-access controller 140. The file system access controller enables the operating system to read and write to the file system. The operating system provides support for a number of application programs and 'middleware programs' that are stored in the file system. Middleware programs are application-support infrastructure products that can greatly simplify application programming when provided between application programs and an operating system.

In the embodiment of FIG. 1, the data processing systems 20, 30, 40 form part of a distributed software development environment and the application programs include development tools 150 such as an application modeler and code generator, a source editor, a source debugger and build tools including a compiler or interpreter. The above-described features are all well-known features of conventional data processing systems that are used in a development environment. In a first example embodiment, the programs being developed are complex middleware programs.

The particular distributed software development environment of FIG. 1 supports development using one or more 'backing builds' 200, 210 and 'sandboxes' 160, 170, 180. As noted above, a backing build is a set of program code resources that can only be updated with administrator approval or under lock management controls, to ensure code stability. If a large team of developers are each able to make changes to a code base simultaneously and independently, it would be impossible to ensure that all developers are working on the latest version of each program component and this could result in inconsistencies that cannot be resolved by a simple synchronization. Use of backing builds avoids that problem. As noted above, sandboxes are private program development environments that are isolated from other sandboxes and isolated from other developers. Code may be developed within a developer's isolated sandbox and then combined with a pre-existing set of computer program resources.

When working within a sandbox 180 on system 30, a developer is able to download required elements of a backing build 210 for a project of interest ('PROJ.11' for example) from disk storage of the server system 40. Typically, a developer working on a large application-support infrastructure product such as an application server or messaging middleware product will only wish to download a small proportion of the total program. The developer writes new code, including creating new files and changing existing files within the sandbox 180. The development tools 150 include a compiler and other build tools and so the developer is able to compile the combination of new code and the downloaded elements of the backing build within the sandbox 180. If the build is successful and tests performed against this build give satisfactory results, the program code developed in the sandbox may be uploaded to the server system where the administrator can carry out required reviews and create an updated backing build that incorporates the new code. Such a distributed development solution is known in the art and is a satisfactory solution for testing the effects of adding and changing program files.

However, using conventional solutions, problems arise when trying to evaluate the effects of removing files. This is because of the difficulty determining whether any of the various development tools or other programs is implicitly referencing a file that the developer wants to treat as having been removed. Merely listing files that the developer wishes to treat as 'absent' is not a satisfactory solution, because the developer may fail to identify some of the programs which reference the nominally-absent files. (Such identification of references to files can be especially difficult if a referenced file name is only constructed when the reference to it is required). Modifying each of the various development tools and other application programs to disregard listed (nominally-absent) files is impractical. In view of these problems, developers currently require a complete program rebuild following actual removal of program files. Since the rebuild can take some hours to complete for a large application-support infrastructure product, a better solution is needed.

According to a first embodiment of the present invention, developers are also able to evaluate the effects of removing files. This is achieved by creating distinct layers within a multi-layer filesystem, including at least a back layer and an anti-file layer, and creating an anti-file within the anti-file layer that corresponds to a first file within the back layer. A filesystem-access controller is able to identify the distinct layers and to identify a match between the first file and its anti-file. The file system access controller interprets the anti-file as an instruction to mask the presence of the first file. That is, the file system access controller can deny the existence of the first file in response to any program or data processing system that attempts to access the first file via the file system access controller. While the file system access controller is masking the presence of the first file, various operations can be tested against the resulting logical combination of files.

A new logical file system created on a client system according to this first embodiment of the invention includes the following program resources:

a downloaded set of program files saved within a directory '/back' (i.e. a selected set of files from a pre-existing 'backing build' comprising pre-existing source code files, header files and associated resources referred to below as 'background resources');

at least one anti-file comprising a reference to a first file of the selected set of files, the anti-file being saved within a directory '/anti'; and a set of added files and file changes saved within a directory '/front' (referred to below as 'new resources').

A file system driver for the current file system is given a set of pointers to these three sets of resources, together with an identification of which of the '/back', '/anti' and '/front' directories the resources should be held in. The set of pointers effectively populates the new logical file system. In this first embodiment, the new logical file system is thus created without duplicating any files, and the three sets of resources are held in three separate logical directories but the underlying files may all be held in the same area of physical data storage.

When a build tool or some other application wishes to access the new set of program code components, the filesystem driver checks the set of pointers for the three logical directories corresponding to the three sets of resources. The particular sequence of processing implemented by the file system driver depends on the requested operation, and a number of example operations are described below with reference to FIGS. 2 to 6. For each example operation, the new resources are identified as present in the logical file system without any masking effect from the anti-files. The anti-files are identified by the file system access controller and compared with the background resources. Any files within the background resources that match an identified anti-file are declared by the filesystem-access controller as absent from the logical file system. Any files within the background resources that are not matched by anti-files are identified as present in the new logical file system. In this way, the filesystem driver (or another filesystem access controller) controls access to files within a logical filesystem by taking account of one or more anti-files and interpreting the anti-files as instructions to mask the presence of the corresponding files in the back layer.

In one embodiment, the anti-files are merely conventional filenames that are held in the dedicated '/anti' directory of the new logical filesystem. Background resources are held in a '/back' directory and new resources are held in a '/front' directory. The file system access controller interprets the directory names as logical layers, where the front layer overlays the combination of the anti-file layer and the back layer, and where the anti-file layer overlays the back file layer. In this embodiment, the anti-files match the filenames of corresponding files within the back layer. The anti-file file names may be identical to the names of files within the back layer, or the anti-file names may be preceded by a special character (such as a '-' character, for example) to simplify their differentiation from conventional files.

In a first example of the latter embodiment, there are four files forming a first set of program files. The filenames are: "test.c", "newlibrarycode.c", "oldlibrarycode.c" and "librarycode.h". A system user or administrator wishes to confirm that the file "oldlibrarycode.c" is no longer needed, without removing the file from the codebase as yet. The solution is to create a new logical filesystem including the files: "test.c", "newlibrarycode.c", "oldlibrarycode.c", "librarycode.h" and anti-"oldlibrarycode.c", where the file anti-"oldlibrarycode.c" is represented by a file "oldlibrarycode.c" (or merely a file reference) placed in directory '/anti'. The other files are placed in directory '/back' with their original names.

The filesystem driver interprets anti-"oldlibrarycode.c" as an instruction to mask "oldlibrarycode.c", and so the contents of the new filesystem as declared to other programs by the filesystem driver comprises the three files: "test.c", "newlibrarycode.c" and "librarycode.h". The previous file "oldlibrarycode.c" remains present in an underlying filesystem, but programs which use the normal directory-access APIs will not detect it or any other file that has been masked by its anti-file.

A build process can be run against this new logical filesystem and the filesystem driver will continue masking files as required. If the build is unsuccessful, the developer can easily return to the codebase as it was before the apparent file removal, by simply removing the anti-files that mask other files.

Figure 2:
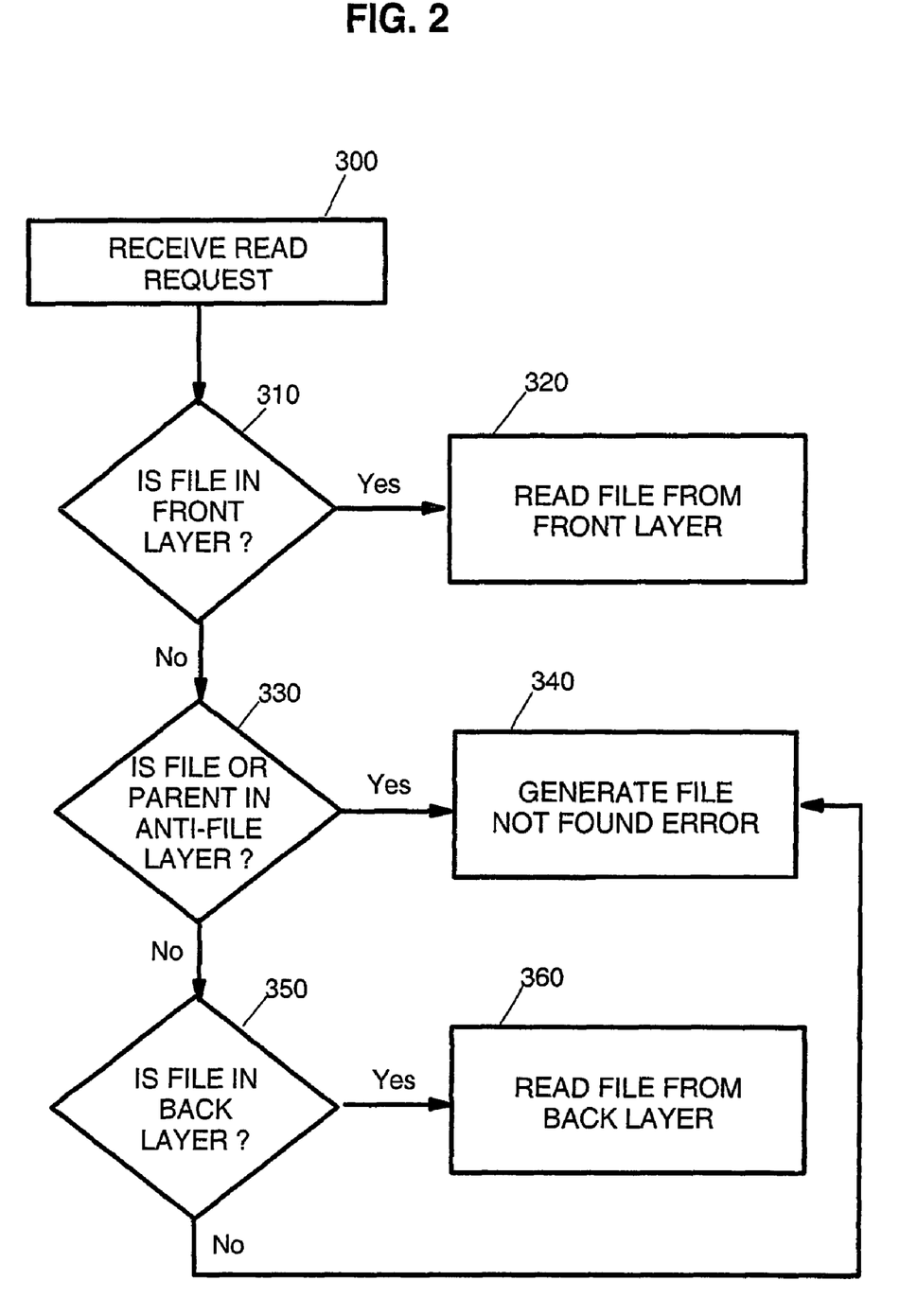
FIG. 2 is a schematic flow diagram representation of the steps of a method implemented by a file system driver in response to an attempt to read a file, according to an embodiment of the invention.

FIG. 2 shows of the steps of a method implemented by a file system driver in response to a computer program attempting to read a file, according to an embodiment of the invention. The computer program may be any program that uses the file access API of the file system driver to request access to files within the new multi-layer logical file system. When the file system driver receives 300 a read request, a first check is performed 310 by the driver of whether the requested file is in the front layer (in this embodiment, the '/front' directory) of the logical file system. If the file is in the front layer, there is no need to check for masking anti-files and the file is read 320 from the front layer.

However, if the requested file is not in the front layer, a second check is performed 330 of whether the name of the requested file or a parent of the requested file is present in the anti-file layer (the '/anti' directory or file). A parent in this context is merely a higher-level node within the hierarchy of the logical file system. For example, if a requested file is identified as '/ancestor1/ancestor2/child', then both 'ancestor1' and 'ancestor2' are referred to herein as parents of the file 'child'. If the name of the requested file or a parent is found within the anti-file layer, the file system driver generates 340 a "file not found" error message and returns this message to the requesting program. That is, the file system driver declares that the requested file does not exist within the logical file system. The file system driver is able to identify the presence of the requested file, but the file system driver masks the presence of the requested file from the requesting program.

If the requested file does not have a matching file name (its own name or a parent) within the anti-file layer, a third check is performed 350 of whether the requested file is in the back layer. This back layer is a file system or directory that was overlaid by the anti-file layer and the front layer to form the multi-layer logical file system. If the requested file is determined 350 at this stage to be in the back layer, the file is read 360 from the back layer. If the determination 350 produces a negative result, the file system driver generates 340 a "file not found" error message and returns this message to the requesting program.

An equivalent flow to that shown in FIG. 2 is implemented by the file system driver in response to a request to check the permissions on the file (instead of requesting read access to the data within the file). If a file for which a program wishes to check permissions is within the front layer of the multi-layer logical file system, the file system driver facilitates checking of permissions against the front layer. If the file or a parent of the file is not in the front layer but is referenced in the anti-file layer, the file system driver declares "file not found". If the file is not within the front layer and there is no relevant reference in the anti-file layer, a check is performed of whether the file is in the back layer and then, if so, permissions are checked against the back layer.

Figure 3:
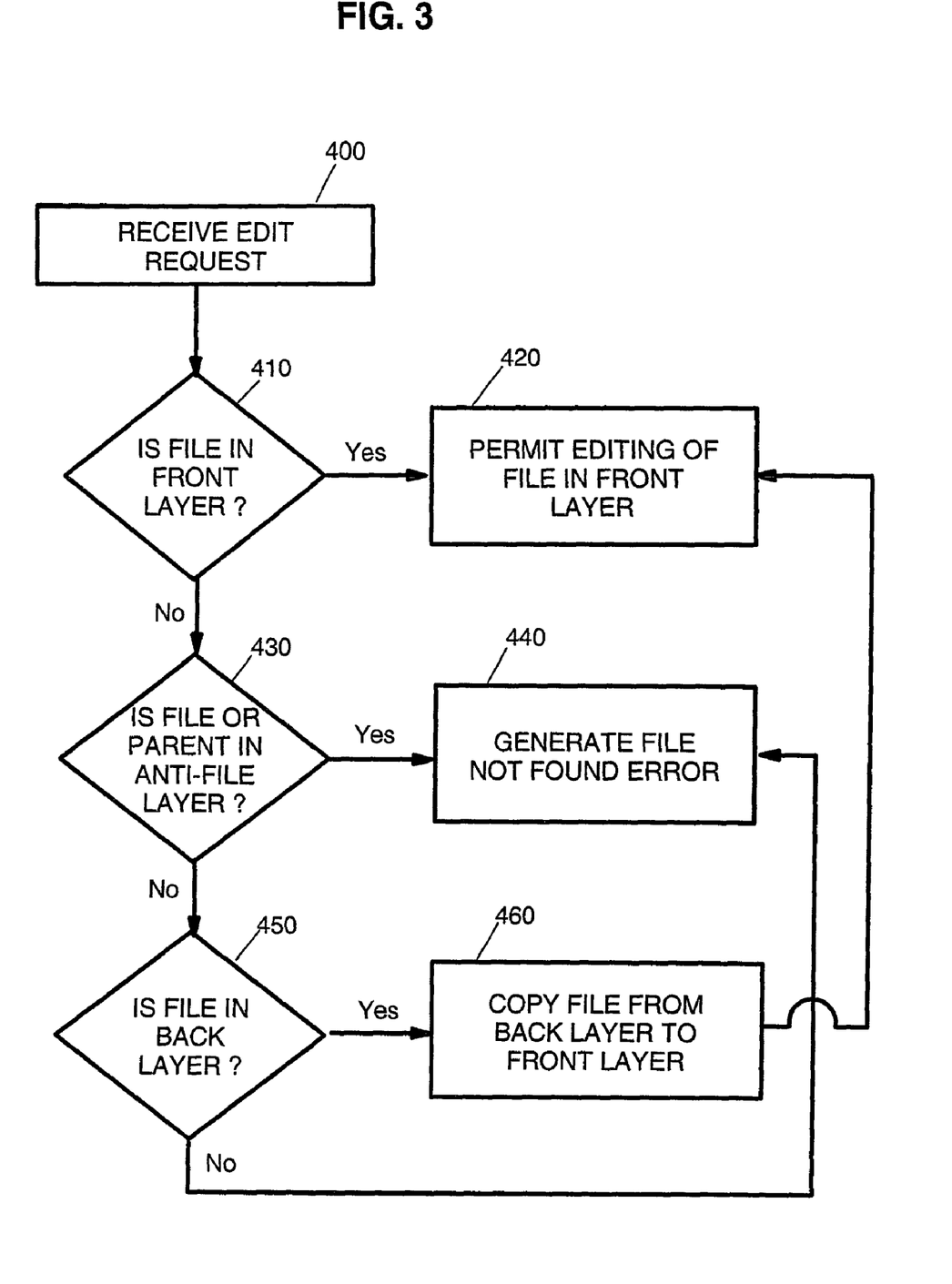
FIG. 3 shows the steps of a method implemented by a file system driver in response to an attempt to edit a file.

FIG. 3 is a schematic representation of the steps of a method performed by the file system driver in response to a computer program attempting to edit a file within the multi-layer logical file system. The file system driver receives 400 an edit request and determines 410 whether the requested file is available in the front layer of the logical file system. If the file is present in the front layer, the file system driver permits 420 the requesting program to edit the file within the front layer.

If the requested file is not in the front layer, the file system driver determines 430 whether the anti-file layer contain a reference to the requested file or contains a reference to a parent of the requested file. If any such reference is found in the anti-file layer, the file system driver generates 440 a "file not found" error and returns this to the requesting program.

If the requested file was not in the front layer or referenced in the anti-file layer, the file system driver determines 450 whether the file is within the back layer of the multi-layer logical file system. If this determination is negative, the file is not present in the logical file system and so the file system driver generates 440 a "file not found" error. If the file is present in the back layer, the file system driver copies 460 the requested file from the back layer into the front layer, and then permits 420 editing within the front layer.

An equivalent flow to that shown in FIG. 3 is implemented by the file system driver in response to an attempt by a program to change file permissions. If the relevant files are in the front layer of the multi-layer logical file system, the file system driver permits the changing of file permissions within the front file system layer. Note that in the present embodiment, any such update is being performed within a sandbox that may or may not be subsequently applied to a backing build. Therefore, it is not essential at this time to check the authority level of the program or user that is requesting the change. If the relevant files are not in the front layer a check is performed of whether the files are referenced in the anti-file layer, and this determines whether the presence of the files should be masked by generating a "file not found" error. If the files are neither in the front layer nor referenced in the anti-file layer, a determination is made of whether the files exist in the back layer. If in the back layer, the files are copied to the front layer and then permissions are changed in the front layer.

An equivalent flow to that shown in FIG. 3 is also implemented in response to a request to change directory permissions. If the directory is not within the front layer nor referenced in the anti-file layer, but is present in the back layer, the directory is created in the front layer and then directory permissions can be changed in the front layer.

Figure 4:
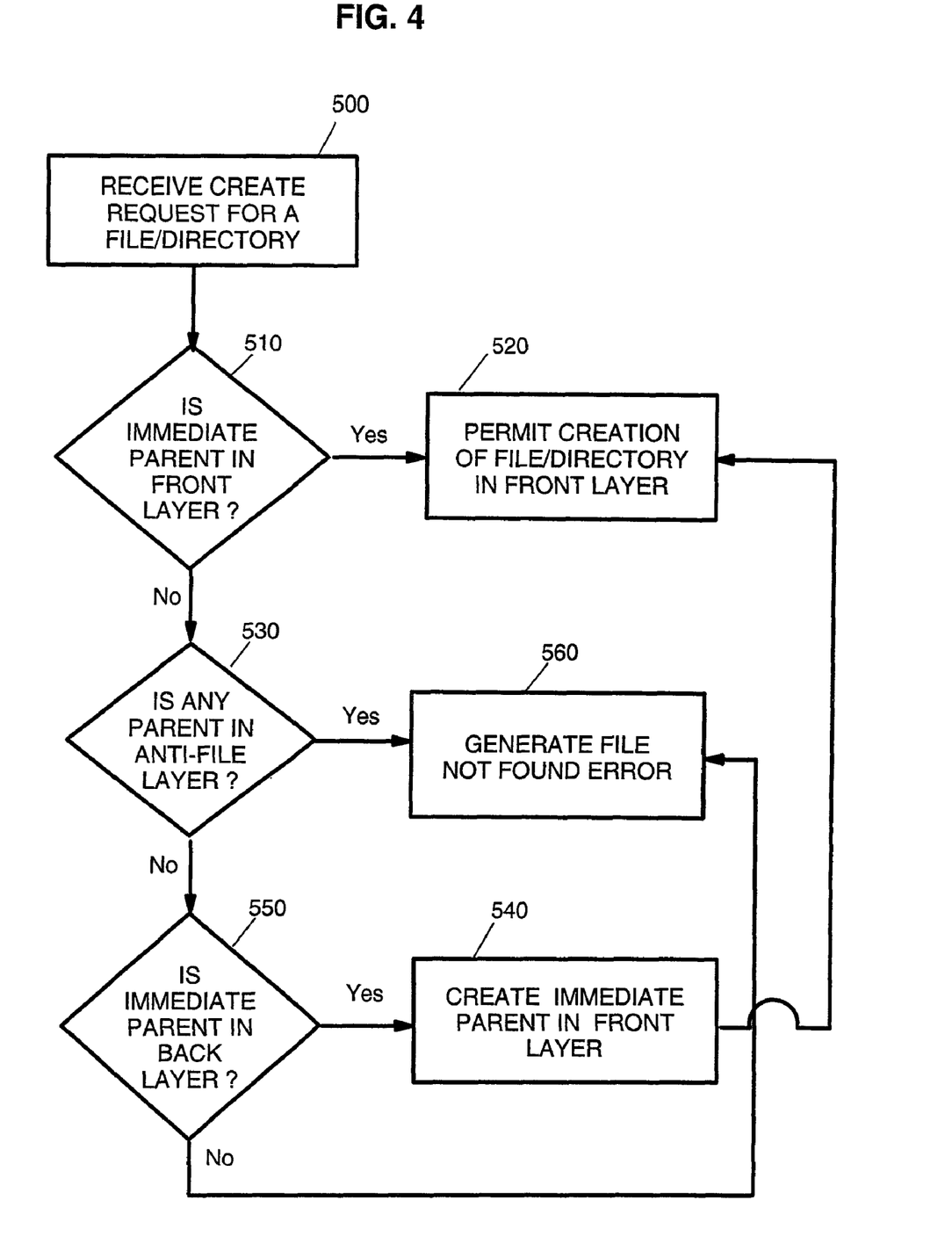
FIG. 4 shows the steps of a method implemented by a file system driver in response to a request to create a file.

FIG. 4 shows the steps of a method performed by a file system driver in response to a request to create a file or directory. The process starts when the file system driver receives 500 a request to create a file or directory. A check is performed 510 by the file system driver of whether the immediate parent of the file that is to be created is already in the front layer of the multi-layer logical file system. If the parent is already present in the front layer, the file system driver permits 520 creation of the file or directory in the front layer.

If the parent is not in the front layer, a check is performed 530 of whether any parent for the file or directory is referenced in the anti-file layer. If a parent is referenced in the anti-file layer, the file system driver will mask the presence of the parent as described above and generate a "file not found" error 560. This prevents a program from creating a file or subdirectory in a directory that does not logically exist.

If the check 530 of the anti-file layer does not identify any reference to a parent of the file or directory that is to be created, a check is performed 550 of whether the immediate parent for the file or directory is present in the back layer. If the immediate parent is present in the back layer, the parent is copied 540 to the front layer and the file or directory can then be created 520 in the front layer. If the immediate parent is not within the front layer or the back layer, the file system driver will generate a "file not found" error 560. This prevents a file or directory being created in a directory that does not exist.

Figure 5:
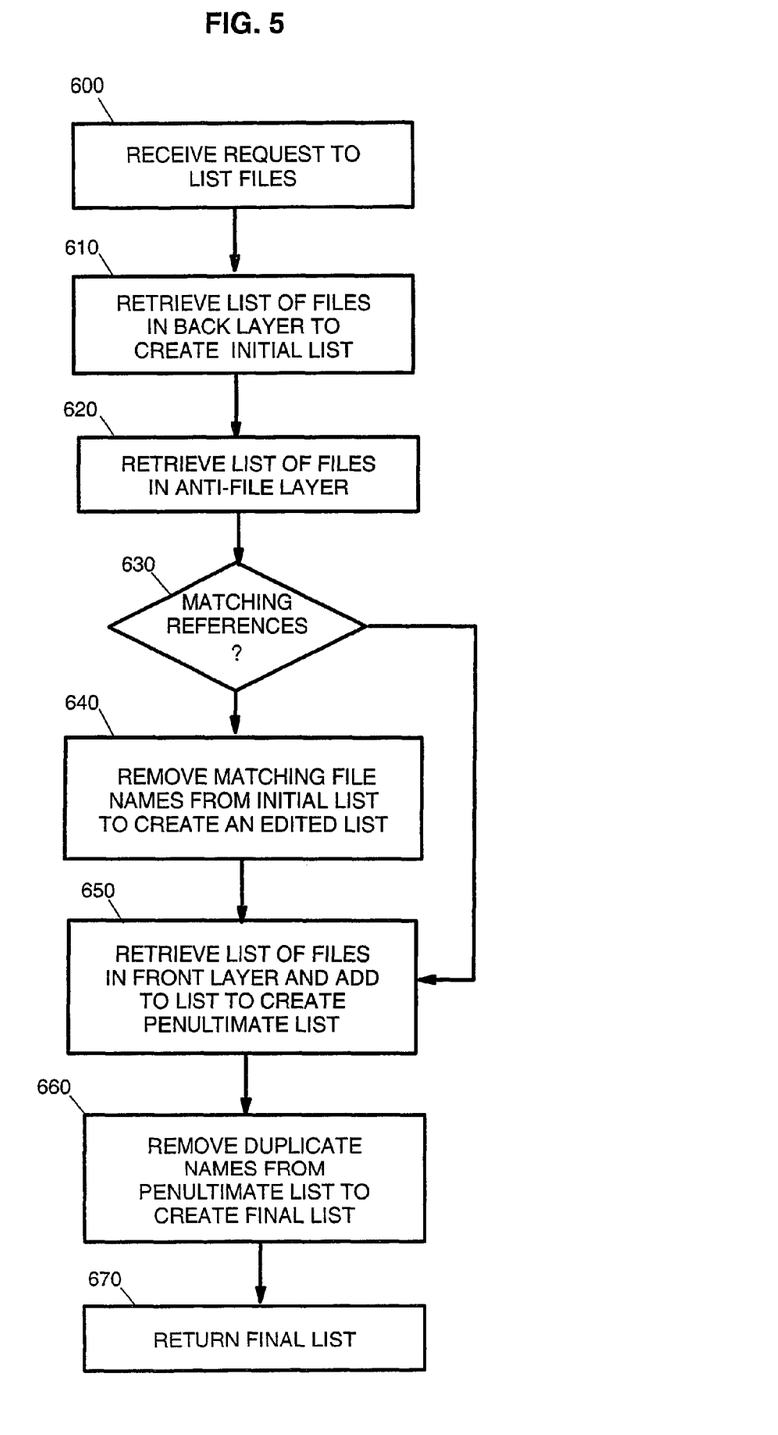
FIG. 5 is a schematic representation of a method for listing the files in a directory, according to an embodiment of the invention.

FIG. 5 shows a sequence of steps of a method for listing the files in a directory, using an anti-file aware filesystem driver according to the invention. The process starts when the file system driver receives 600 a request to list the files in a directory of the multi-layer logical file system. The file system driver initially retrieves 610 a list of relevant files (if any) for the named directory from the back layer of the logical file system. The file system driver then retrieves 620 a list of files and directories in the anti-file layer, and checks 630 for any matching references to files or directories between the anti-file layer and the back layer. The file system driver then removes 640 from the initial list any files or directories which have a relevant entry (a matching file name or name of a parent) in the anti-file layer. This creates an edited list. The file system driver then retrieves 650 a list of file and directories within the front layer, and adds these to the list to create a penultimate list. Note that the entries in the front layer are added regardless of whether there was a matching entry in the anti-file layer; the front layer takes precedence and overlays the anti-file layer, whereas the anti-file layer takes precedence over the underlying back layer. The file system driver then removes 660 any duplicate entries from the penultimate list to create a final list. The final list is returned 670 to the requester.

Figure 6:
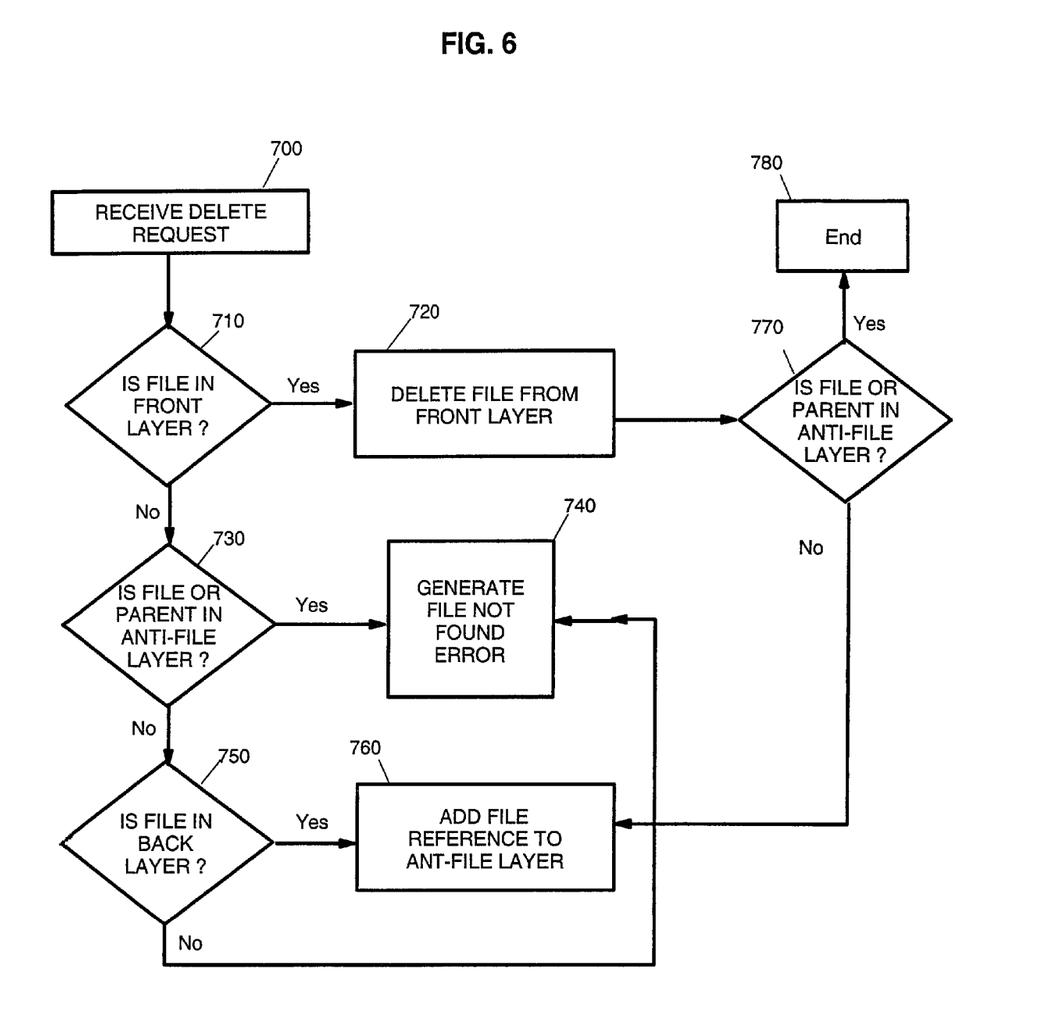
FIG. 6 shows the steps of a method implemented by a file system driver in response to an attempt to delete a file.

FIG. 6 shows a sequence of steps of a method implemented by a file system driver in response to a request to delete a file. The process starts when the file system driver receives 700 a delete request. The file system driver determines 710 whether the file exists in the front layer. If present in the front layer, the file system driver permits deletion 720 of the file from the front layer, and then checks 770 whether the file or a parent is referenced in the anti-file layer. If the file or parent is referenced in the anti-file layer, the process ends 780. If the file or parent is not referenced in the anti-file layer, a reference to this file is added 760 to the anti-file layer and the process ends. If the file is not present in the front layer, a check is performed 730 of whether the file or a parent of the file is referenced in the anti-file layer. If such a reference exists already, the process generates a "file not found" error 740 because the file is already masked. If the file and its parents are not referenced in the anti-file layer, a check is performed 750 of whether the file exists in the back layer. If this determination is positive, a reference to this file is added 760 to the anti-file layer. This will then have the effect of masking the referenced file from other programs that attempt to access the file. If a determination 750 is made that the file was not present in any layer of the multi-layer logical file system, the process generates a "file not found" error 740.

A flow similar to that shown in FIG. 6 may be implemented in response to a request to delete a directory. However, when processing a request to delete a directory, superfluous file references can be removed to simplify the anti-file layer. This is achieved by removing from the anti-file layer all references to children of the directory, before adding a reference to the directory itself to the anti-file layer.

As noted earlier, the file masking mechanism of the present invention is not limited to sandboxes and backing builds in a distributed development environment. The invention is equally applicable in other environments such as where a system administrator wishes to test the effect or removing one or more files from a run-time data processing environment. This invention can be used when a planned update to a set of computer program files requires testing the effect of removing at least one file.

Therefore, the present invention implements an anti-file for a first file within a multi-layer logical filesystem in which the anti-file is used to mask the presence of the first file. The anti-file does not permanently delete the first file, but instead a filesystem-access controller interprets the anti-file as an instruction to reversibly mask the presence of the first file from any programs that attempt to access the first file via the file system access controller. For example, in a development environment in which a sandbox overlays a source code tree, a file that is masked by an anti-file is not permanently removed from the original source code tree. Instead, the masking enables a simpler build process and hence efficient testing of the effects of removal of the file, without an irreversible file deletion.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description but is not intended to exhaust or limit the invention in the form disclosed. Many modifications and variations will be apparent to those of ordinary skill in the art. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A file system access-controller for testing a file system, comprising:

a processing unit;

means for identifying a set of logically distinct layers in a new logical file system under test as part of a build process by the file system access-controller having the processing unit wherein the new logical file system includes a front layer, an anti-file layer and a back layer, wherein the back layer includes a first set of file system resources and wherein the anti-file layer includes an anti-file that designates a first file in the back layer to be reversibly masked by the file system access-controller to test the new logical file system to determine if the new logical file system functions properly with the first file effectively removed therefrom without actually removing the first file;

means for identifying a match between the anti-file in the anti-file layer and the first file within the back layer by the file system access-controller and interpreting the anti-file in the anti-file layer as an instruction to reversibly mask the presence of the first file from any programs attempting to access the first file;

means, responsive to identifying a match, for simulating the removal of the first file for testing purposes by reversibly masking the presence of the first file to at least one requester, by the file system access-controller, without removing the first file from the back layer; and means, responsive to reversibly masking the presence of the first file, for testing the new logical file system while the presence of the first file is reversibly masked to determine if the new logical file system functions properly with the first file effectively removed therefrom for testing purposes.

2. The file system access controller according to claim 1, further comprising means for identifying a front file system layer, wherein the front layer comprises an additional set of file system resources that overlay the anti-file layer and the back layer.

3. The file system access controller according to claim 1, wherein the means for identifying a set of logically distinct layers comprises means for recognizing a directory name of a directory corresponding to the back layer, and wherein the first set of file system resources of the back layer are assigned to the back layer directory.

4. The file system access controller according to claim 1, wherein the means for identifying a set of logically distinct layers comprises means for recognizing a directory name of a named anti-file directory to which a set of file references of the anti-file layer are assigned.

5. The file system access controller according to claim 1, wherein the means for identifying a set of logically distinct layers comprises means for recognizing a file name of a named file containing a set of file references of the anti-file layer.

6. The file system access controller according to claim 1, wherein the means for identifying a match comprises means for checking the anti-file layer for a file reference for the first file.

7. The file system access controller according to claim 6, wherein the means for identifying a match further comprises means for checking the anti-file layer for a reference for a parent of the first file.

8. The file system access controller according to claim 1, wherein said means for masking the presence of the first file comprises means, responsive to a request from a first requester for access to the first file, for generating a file not found error message and returning the error message to the first requestor.

9. The file system access controller according to claim 1, wherein said at least one requestor is a computer program requesting performance of an operation in relation to the first file, said operation is one of: read, write, edit, delete, create, execute or change permission.

10. A method for testing a file system, comprising the steps of:

identifying a set of logically distinct layers in a new logical file system under test as part of a build process by a file system access-controller having a processing unit, wherein the new logical file system includes a front layer, an anti-file layer and a back layer, wherein the back layer includes a first set of file system resources and wherein the anti-file layer includes an anti-file that designates a first file in the back layer to be reversibly masked by the file system access-controller to test the new logical file system to determine if the new logical file system functions properly with the first file effectively removed therefrom without actually removing the first file;

identifying a match between the anti-file in the anti-file layer and the first file within the back layer by the file system access-controller and interpreting the anti-file in the anti-file layer as an instruction to reversibly mask the presence of the first file from any programs attempting to access the first file;

masking the presence of the first file to at least one requester, by the file system access-controller, in response to identifying a match without removing the first file from the back layer; and testing the new logical file system while the presence of the first file is reversibly masked to determine if the new logical file system functions properly with the first file effectively removed therefrom for testing purposes.

11. A data processing system comprising:
a data processing unit;
a data storage unit;
a file system comprising a logical arrangement of data within the data storage unit, the file system including a first file within a first file system layer;
means for creating an anti-file for the first file, the anti-file comprising a reference to the first file, within an anti-file layer of the file system; and
a file system access-controller, for managing file system access for at least one requestor, comprising:
  means for identifying a set of logically distinct layers in a new logical file system under test as part of a build process by the file system access-controller having a processing unit wherein the new logical file system includes a front layer, an anti-file layer and a back layer, wherein the back layer includes a first set of file system resources and wherein the anti-file layer includes an anti-file that designates a first file in the back layer to be reversibly masked by the file system access-controller to test the new logical file system to determine if the new logical file system functions properly with the first file effectively removed therefrom without actually removing the first file therefrom;
  means for identifying a match between the anti-file in the anti-file layer and the first file within the back layer by the file system access-controller and interpreting the anti-file in the anti-file layer as an instruction to reversibly mask the presence of the first file from any programs attempting to access the first file;
  means, responsive to identifying a match, for simulating the removal of the first file for testing purposes by reversibly masking the presence of the first file to at least one requester, by the file system access-controller, without removing the first file from the back layer; and
  means, responsive to reversibly masking the presence of the first file, for testing the new logical file system while the presence of the first file is reversibly masked to determine if the new logical file system functions properly with the first file effectively removed therefrom for testing purposes.

12. The data processing system according to claim 11, wherein the means for creating an anti-file comprises means for assigning a created file reference to an anti-file directory.

13. The data processing system according to claim 11, wherein the means for creating an anti-file comprises means for appending a created file reference to a list of anti-file references within a database table.

14. A computer program product comprising a computer usable medium having computer usable program code for managing file system access for at least one requester, said computer program product including:
  computer usable program code for identifying a set of logically distinct layers in a new logical file system under test as part of a build process by a file system access-controller having a processing unit wherein the new logical file system includes a front layer, an anti-file layer and a back layer, wherein the back layer includes a first set of file system resources and wherein the anti-file layer includes an anti-file that designates a first file in the back layer to be reversibly masked by the file system access-controller to test the new logical file system to determine if the new logical file system functions properly with the first file effectively removed therefrom without actually removing the first file;
  computer usable program code for identifying a match between the anti-file in the anti-file layer and the first file within the back layer by the file system access-controller and interpreting the anti-file in the anti-file layer as an instruction to reversibly mask the presence of the first file from any programs attempting to access the first file;
  computer usable program code for, in response to identifying a match, simulating the removal of the first file for testing purposes by reversibly masking the presence of the first file to at least one requester, by the file system access-controller, without removing the first file from the back layer; and
  computer usable program code for, in response to reversibly masking the presence of the first file, testing the new logical file system while the presence of the first file is reversibly masked to determine if the new logical file system functions properly with the first file effectively removed therefrom for testing purposes.

* * * * *